Patented Jan. 11, 1938

2,104,753

UNITED STATES PATENT OFFICE 2,104,753

LOCAL ANESTHETIC

Randolph T. Major, Plainfield, N. J., and Albert B. Boese, Pittsburgh, Pa., assignors to Merck & Co., Inc., Rahway, N. J., a corporation of New Jersey No Drawing. Application November 14, 1934, Serial No. 752,940

6 Claims. (Cl. 260—105)

The present invention relates to new local anesthetics and processes for their production.

Certain diaryl carbamic acid alkylamine esters have hitherto been found to have local anesthetic action, and the object of the invention described herein is the production of certain new compounds of this general class which have marked value in this respect, but which are nevertheless of relatively low toxicity as compared with other known compounds of this general class.

Typical of the compounds of this series produced by us is diethylaminoethyl-N-phenyl-α-naphthylamine-N-carboxylate. This has been prepared by the reaction of sodium diethylaminoethylate upon phenyl-α-naphthylcarbamyl chloride in an inert solvent, as will be more fully described in the examples to follow. By a similar process, other related aryl-α-naphthylamine carbamic acid esters of alkylamines have also been prepared, such as, for instance, 1,3-bis-diethylamino-propane-2-N-phenyl-α-naphthylamine-N-carboxylate and 1,3-bis-dimethylamino-2-ethylpropane-2-N-phenyl-α-naphthylamine-N-carboxylate, and salts thereof.

In some practical therapeutic applications, the use of the water soluble salts of these compounds in the form of their mono-hydrochloride, sulphates, phosphates, acid citrate and tartrates is more advantageous, and salts of acids of the type generally used for medicinal purposes.

The general process described herein has been found generally valid for aryl-α-naphthylamine carbamic acid esters of alkylamines of this type.

In carrying out our process for the production of these α-naphthylamine carboxylates, we produced our phenyl-α-naphthylcarbamyl chloride according to the general method given by Kym in Berichte der Deutschen Chemischen Gesellschaft, 23, 425 (1890), which is explained below.

The attempted derivation of our new series of compounds from phenyl-α-naphthylcarbamyl chloride according to the method given in D. R. P. 272,529 for the preparation of aryl-carbamic acid esters of alkylamines generally was not successful, and thus the method described in that patent for the production of alkylamine esters of diaryl-N-carboxylic acid generally does not appear to be broadly applicable to all such aryl compounds. While, for instance, the process may be satisfactory enough for the production of di-phenyl amino-N-carboxylic acid esters, it is not valid for producing the corresponding aryl-α-naphthylamine-N-carboxylic acid esters.

The methods for the production of this class of new α-naphthylamine derivatives are set forth by way of illustration in the examples to follow.

The phenyl-α-naphthylcarbamyl chloride, used in our process, is made, in analogy with the method of Kym mentioned above, by adding a cold solution of 25 grams of phosgene in 200 cc. of chloroform to a solution of 50 grams of phenyl-α-naphthylamine in 300 cc. of dry chloroform at 10° C. The mixture is allowed to stand in the cold for twenty-four hours, during which time a precipitate of the hydrochloride of phenyl-α-naphthylamine is formed. This is removed by filtration. When the filtrate has evaporated, there remains an oil which slowly crystallizes. The compound is recrystallized from alcohol. The crystals occur as colorless needles which melt at 105° C. The yield is about 26 grams.

EXAMPLE

*Diethylaminoethyl-N-phenyl-α-naphthylamine-N-carboxylate*

Seventeen and eight-tenths grams of diethylaminoethyl alcohol are added to 3.5 grams of powdered sodium in 300 cc. of xylene. The mixture is heated to 100–120° C. for eight to ten hours, during which time the sodium dissolves and a colorless gelatinous precipitate is formed. To the reaction mixture is added a solution of 42.9 grams of phenyl-α-naphthylcarbamyl chloride. A precipitate of sodium chloride is promptly formed. The mixture is refluxed for one-half hour, cooled and filtered from the sodium chloride. The reaction product is precipitated from the filtrate as the hydrochloride by passing through it a stream of dry hydrogen chloride. This compound is then separated by filtration and washed with dry ether. Thereafter it is dissolved in water, treated with a small amount of decolorizing carbon, filtered, and the filtrate made alkaline with sodium carbonate. The free compound precipitates as an oil. This oil is extracted with ether, and the ether extract washed several times with water, and then dried over anhydrous sodium sulfate. When the ether has evaporated, an oil remains which, on standing, gradually solidifies to a crystalline mass. When this mass is recrystallized from ether, the crystals occur as colorless prisms with a melting point of 60–61° C. They are insoluble in water, but soluble in the common organic solvents. The yield is about 42 grams.

The pure hydrochloride of this product is formed by dissolving ten grams thereof in 150 cc. of dry ether. The hydrochloride is precipitated by passing through the solution a stream of dry hydrogen chloride. This precipitate is then filtered, washed with ether and dried in vacuo over calcium chloride. It occurs as a colorless microcrystalline, non-hygroscopic substance melting at 214–215° C., soluble in water, the lower alcohols and chloroform, and insoluble in ether, ligroin, benzene, toluene, xylene and similar solvents.

The acid citrate is formed by dissolving seven and two-tenths grams of the free carboxylate in 300 cc. of dry ether. To this is added a solution of 3.8 grams of anhydrous citric acid in seven cc. of absolute alcohol. The acid citrate of the base separates as a flocculent white precipitate. This is separated by filtration, washed with ether and dried under a vacuum over calcium chloride. It occurs as a colorless hygroscopic microcrystalline substance. When it is heated in a melting-point tube it gradually softens and decomposes with effervescence between 50 and 80° C. It is soluble in water, the lower alcohols and chloroform, and insoluble in ether, ligroin, benzene, toluene, xylene and similar solvents.

The acid tartrate is prepared in the conventional manner from the pure base. It occurs as a very hygroscopic colorless microcrystalline material, soluble in water, alcohol and chloroform but insoluble in ether, ligroin, toluene, and other common organic solvents. It softens and decomposes when heated between 80–90° C.

The neutral sulphate is also prepared in the conventional manner from the pure base. It occurs as a very hygroscopic, colorless, microcrystalline substance, soluble in water, alcohol, and chloroform, but insoluble in ether, ligroin, toluene, and chloroform, and other common organic solvents. It softens and decomposes between 60–80° C.

We claim as our invention:

1. A phenyl-$\alpha$-naphthyl carbamic acid alkylamine ester.

2. Diethylaminoethyl - N - phenyl-$\alpha$-naphthylamine-N-carboxylate occurring as colorless prisms melting at 60–61° C., soluble in all the common organic solvents, but insoluble in water.

3. The hydrochloride of diethylaminoethyl-N-phenyl-$\alpha$-naphthylamine-N-carboxylate occurring as a colorless microcrystalline non-hygroscopic substance melting at 214–215° C., soluble in water, the lower alcohols and chloroform, and insoluble in ether, ligroin, benzene, toluene, xylene, and similar solvents.

4. The acid citrate of diethylaminoethyl-N-phenyl-$\alpha$-naphthylamine-N-carboxylate occurring as a colorless hygroscopic microcrystalline substance, which decomposes with effervescence between 50° and 80° C., being soluble in water, the lower alcohols and chloroform, and insoluble in ether, ligroin, benzene, toluene, xylene, and similar solvents.

5. The process of producing phenyl-$\alpha$-naphthylamine-carbamic acid alkylamine esters, involving the reaction of the sodium salt of a dialkylamino-alkanol upon phenyl-$\alpha$-naphthylamine-carbamyl chloride in an inert solvent.

6. The process of producing diethylaminoethyl-N-phenyl-$\alpha$-naphthylamine-N-carboxylate by the interaction of phenyl-$\alpha$-naphthylcarbamyl chloride and sodium diethylaminoethylate in an inert solvent.

RANDOLPH T. MAJOR.
ALBERT B. BOESE.